Dec. 5, 1933.                    M. PIER ET AL                    1,938,542
     LIQUID AND OTHER HYDROCARBON AND DERIVATIVE THEREOF BY THE
        DESTRUCTIVE HYDROGENATION OF CARBONACEOUS MATERIALS
                    Original Filed March 31, 1928

Fig. 1.

Fig. 2.

MATHIAS PIER
WALTER SIMON
INVENTORS

BY Hauff Harland
ATTORNEYS.

Patented Dec. 5, 1933

1,938,542

UNITED STATES PATENT OFFICE 1,938,542

LIQUID AND OTHER HYDROCARBON AND DERIVATIVE THEREOF BY THE DESTRUCTIVE HYDROGENATION OF CARBONACEOUS MATERIALS

Mathias Pier, Heidelberg, and Walter Simon, Ludwigshafen-on-the-Rhine, Germany, assignors, by mesne assignments, to Standard-I. G. Company, Linden, N. J., a corporation of Delaware Application March 31, 1928, Serial No. 266,445, and in Germany August 7, 1926. Renewed March 7, 1933

7 Claims. (Cl. 196—53)

The present invention relates to the destructive hydrogenation of carbonaceous materials such as the various kinds of coal, tars, mineral oils, distillation, extraction and conversion products and residues thereof and the like by treatment with hydrogen or gases containing or giving off hydrogen, these being equivalents for the purposes of the present invention, at elevated temperatures and under pressure preferably high pressure of at least 50 atmospheres with the aid of catalysts.

We have now found that excellent yields in valuable hydrocarbons and derivatives thereof in particular those of low boiling point may be obtained by working under pressures of at least 50 atmospheres preferably at much higher pressures such as 100 atmospheres or more, and with a large excess of hydrogen which is employed in the form of a stream, and employing catalysts comprising inorganic carbides or active carbon. The said catalytic substances may be employed with special advantage in conjunction with elements of the 2nd to 8th group of the periodic system especially those of the 6th group. The catalysts may for example contain phosphoric acid, arsenious acid, silicic acid, boric acid, hydrofluoric acid, hydrochloric acid, selenious acid or salts thereof. Suitable catalysts are also for example silicon carbid, alderwood charcoal heated to glowing at 800° centigrade and soaked with phosphoric acid, alone or more suitably together with molybdenum or tungsten. The said catalysts are distinguished by their property of being immune to poisoning by sulphur.

The process is preferably carried out in a circulatory system. Care should preferably be taken that materials such as iron which would give rise to the formation of methane and the separation of carbon should not be present in those parts of the apparatus which come into contact with the hot reacting materials. Accordingly these parts should preferably be made of or coated with highly alloyed steels or aluminum and the like. Care should also be taken to provide for an intimate contact between the materials to be destructively hydrogenated and the hydrogenating gas; this may be effected for example by stirring. The reacting materials may also be atomized or sprayed into the reaction chamber or the materials are exposed to the action of the hydrogenating gas in thin layers or the gas is introduced into the said materials through a porous layer or plate.

Difficultly decomposable initial materials are preferably subjected to a preliminary tratment with hydrogen under pressure with or without the aid of catalysts and thus converted into middle oils which are then treated in the manner hereinbefore described.

When carbides are employed added nitrogen or compounds of nitrogen must be absent in the catalyst. It is very advantageous when employing catalysts containing active carbon to have phosphorus or arsenic present or a compound thereof.

In the accompanying drawing, an apparatus for carrying out the one stage process and an apparatus for carrying out the two stage process, both being continous, are illustrated diagrammatically, partly in vertical section. Our invention is not limited to the apparatus illustrated therein, however, but may be varied at will in accordance with the conditions of working.

Referring to the drawing in Fig. 1 in detail, reference numeral 1 indicates a feed line from any convenient source of liquid raw material. The line 1 discharges to a grinding mechanism 2 fitted with a hopper 3 through which solid materials may be admitted. If desired, the grinding mechanism can be by-passed by line 1a when no solid materials are used. The suspension of solid material in liquid or the liquid alone may be then forced by pump 5 through a line 4 to a heat exchanger 6 and thence by line 7 into a reaction chamber 8. The reaction chamber is constructed in any preferred manner and should be adapted to withstand high pressures, for example, above 20–100 or even as high as 800 atmospheres, as well as the corrosive effects of the reactants. The vessel is preferably protected from loss of heat by a suitable insulating cover 9 and may be heated by electric coils 10 which are arranged within the drum. The contents of the drum are preferably kept in a state of agitation by means of a stirring mechanism 11 and, if desired, suitable catalytic materials 11' as indicated above may be attached to the stirring mechanism so that the catalyst is brought into intimate contact with the contents of the vessel.

Hydrogen under high pressure is forced through a line 12, heat exchanger 13 and then by line 14 into the base of the reactor 8 into which it is preferably discharged through a spray pipe 15. A liquid level may be maintained in the drum, for example at the point 16a and gas and vaporous products may be continuously withdrawn by vapor line 16 which is in communication with exchanger 13 and a cooling coil or condenser 17. The condensate and gas is discharged into a separation drum 18 from which the distillate is removed by line 19 to storage, not shown. The gas may be taken off by a pipe 20 to a purifying system indicated at 21, and which may comprise a scrubbing system preferably carried out at high pressure using, for example, soda to remove hydrogen sulfide and oil to remove hydrocarbon constituents from the gas. Purified gas is then recompressed by a booster pump 22 and is forced again into the hydrogen feed line 12. Fresh hydrogen may be introduced by line 23. If desired, oil may be continuously removed from the drum by a line 24 which communicates with heat exchanger 6 and which is withdrawn to storage, not shown, by a suitable line 25.

Referring now to the drawing in Fig. 2 a suitable system is shown for converting solid materials into light liquid oils by two steps. Where possible, the same numeral has been used in Fig. 2 as has already been indicated in Fig. 1. Hydrocarbon oil is withdrawn from any suitable storage, not shown, by a line 1 and may be forced through a grinding mechanism 2 which is fitted with the hopper 3 for the introduction of solid material, such as coal, lignite or the like. The pump 5 forces this mixture through line 4 into the first oven indicated by the numeral 8a. This oven may be constructed in the same manner as the oven 8 shown in Fig. 1 and similar parts are designated by the same numerals. A heavy liquefied material is withdrawn from the base of the oven 8a and may be continuously discharged into the second oven indicated by 8b. This oven may be packed with a suitable solid catalytic material indicated at 11' and with the exception that no stirring mechanism is used it may be constructed similarly to oven 8a.

Hydrogen is forced under high pressure from the line 12, as before, through a heat exchanger 13 and by line 14 and branches 14a and 14b into oven 8a and 8b respectively. Vaporous products and gas are removed from both ovens by vapor line 16a and 16b respectively which may discharge through a single exchanger 13 to condenser 17. The light oils are separated from the gases in the separator 18 from which the oil is removed by 19 and the gases may be removed, purified and recompressed as indicated in Fig. 1. Heavy oil may be continuously withdrawn from the oven 8b and a part or the whole thereof may be continuously discharged through a line 24a, cooler 26 and conducted by line 25 to any suitable storage. If desired, a part of this oil may be re-circulated to line 1 or to line 4 by means of recirculation line 24b, pump 27 and either of the two lines 28 or 29, as is desired.

In the operation of this system solid carbonaceous material containing ash may be continuously fed to the first oven and a sufficient quantity of the oil containing inorganic material may be led from the system by the lines 24a and 25 so as to prevent accumulation within the system. Fresh hydrocarbon oil may be continuously fed in sufficient quantity to carry in the solid material or if desired, a part of the oil withdrawn from the second oven, either containing ash or from which the ash has been removed by filtration, settling centrifugal means or the like may be recirculated for the purpose of bringing in the fresh solid material.

In practice it is desirable to make a few preliminary runs in order to determine the time required for the best yields under a given set of conditions. Generally speaking, with batch operations the total time may be from two to ten hours or more, depending on the yield desired, while with continuous operations the time is usually shorter. When continually feeding liquid or difficultly vaporizable oils, the rate of flow may be in the neighborhood of .3 to .8 volumes of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion, for example, the rate of flow of hydrogen may be in excess of about 600 litres per kilogram of carbonaceous material.

The following example will further illustrate how our invention may be carried out in practice, but the invention is not limited thereto.

*Example*

Crude mineral oil to which aluminium phosphate is added in a fine state of division, is treated with an excess of hydrogen under 200 atmospheres pressure and at 420° centigrade the gas being employed in a circulatory system. From 60 to 70 per cent of the initial product is obtained as middle oil, the vapors of which are then passed at 460° centigrade in an excess of hydrogen over a catalyst, which consists of charcoal obtained by heating alderwood impregnated with phosphoric acid, to glowing. The hydrogenation gases are pumped round in the circulatory system, the pressure being maintained and the gas which has been consumed in the reaction being replaced by fresh gas. On cooling the gases and vapors coming from the reaction vessel, a light colored, mobile liquid product is obtained, which contains about 80 to 90 per cent of hydrocarbons of low boiling point.

What we claim is:—

1. A process for the destructive hydrogenation of carbonaceous materials by treatment with hydrogen at elevated temperatures and under a pressure of at least 50 atmospheres with the aid of catalysts, which comprises employing a current of hydrogen in large excess and a catalyst comprising active carbon and an oxygen-compound of phosphorus.

2. A process of producing hydrocarbons of low boiling point from crude mineral oil which comprises treating a crude oil with an addition of aluminium phosphate with an excess of streaming hydrogen at 200 atmospheres pressure and at 420° C. so as to thereby produce a middle oil and passing the vapors of the resulting middle oil at 460° C. with an excess of hydrogen over a catalyst comprising charcoal obtained by charring wood impregnated with phosphoric acid.

3. A process of producing hydrocarbons of low boiling point from carbonaceous materials which comprises treating the said initial materials with a current of hydrogen in large excess at a temperature of about 460° C. under a pressure of 200 atmospheres and in the presence of a catalyst comprising charcoal obtained by charring wood impregnated with phosphoric acid.

4. A process for the destructive hydrogenation of carbonaceous materials by treatment with hydrogen at an elevated temperature and under a pressure of at least 50 atmospheres with the aid of catalysts which comprises employing a current of hydrogen in a large excess and a catalyst comprising active carbon and an oxygen-compound of an element selected from the group consisting of phosphorus and arsenic.

5. A process for the destructive hydrogenation of liquid hydrocarbons of the nature of tars, mineral oils, distillation, extraction and conversion products of the same, which comprises passing said hydrocarbons in the vapor phase in a current of hydrogen in large excess over a catalyst comprising active carbon and an oxygen compound of phosphorus at an elevated temperature of the destructive hydrogenation range and under a pressure of at least 50 atmospheres.

6. A process for the destructive hydrogenation of liquid hydrocarbons of the nature of tars, mineral oils, distillation, extraction and conversion products of the same, which comprises passing said hydrocarbons in the vapor phase in a current of hydrogen in large excess over a catalyst comprising charcoal obtained by charring wood impregnated with phosphoric acid, at a temperature of about 460° C. and under a pressure of 200 atmospheres.

7. A process for the destructive hydrogenation of liquid hydrocarbons of the nature of tars, mineral oils, distillation, extraction and conversion products of the same, which comprises treating said hydrocarbons with a large excess of hydrogen in the presence of a catalyst comprising active carbon and an oxygen compound of an element selected from the group consisting of phosphorus and arsenic, at an elevated temperature of the destructive hydrogenation range and under a pressure of at least 50 atmospheres.

MATHIAS PIER.
WALTER SIMON.